US006994601B2

(12) United States Patent
Larsson

(10) Patent No.: US 6,994,601 B2
(45) Date of Patent: Feb. 7, 2006

(54) DEVICE AT A BOAT

(76) Inventor: Stefan Larsson, Sjömansgatan 17D, Göteborg (SE) SE-413 15

( * ) Notice: Subject to any disclaimer, the term of this patent is extended or adjusted under 35 U.S.C. 154(b) by 0 days.

(21) Appl. No.: 10/472,706

(22) PCT Filed: Mar. 20, 2002

(86) PCT No.: PCT/SE02/00527

§ 371 (c)(1), (2), (4) Date: Mar. 24, 2004

(87) PCT Pub. No.: WO02/076823

PCT Pub. Date: Oct. 3, 2002

(65) Prior Publication Data

US 2004/0152373 A1 Aug. 5, 2004

(30) Foreign Application Priority Data

Mar. 23, 2001 (SE) .................................... 0101010

(51) Int. Cl.
*B60L 11/02* (2006.01)

(52) U.S. Cl. ............................................. 440/6; 440/84

(58) Field of Classification Search .................... 440/6, 440/7, 84, 87
See application file for complete search history.

(56) References Cited

U.S. PATENT DOCUMENTS

| | | | | |
|---|---|---|---|---|
| 650,558 | A | 5/1900 | Hatch | |
| 1,607,002 | A | 11/1926 | Keller | |
| 2,657,587 | A * | 11/1953 | Volk et al. | 477/12 |
| 5,516,991 | A * | 5/1996 | Hommann | 200/6 R |
| 6,283,808 | B1 * | 9/2001 | Lehmann | 440/88 R |
| 2002/0104748 | A1 * | 8/2002 | Levendis et al. | 200/339 |

* cited by examiner

*Primary Examiner*—Stephen Avila
(74) *Attorney, Agent, or Firm*—Dilworth & Barrese

(57) ABSTRACT

A device for switching between different operation modes of an electrical system on board a boat with an electric motor for propelling the boat comprises a control member (7) adapted to be actuated by hand for carrying out switchings in the electrical system between states corresponding to different operation positions thereof. A movable part (10) provided with first contact members (11) is movable with respect to a fixed part (9) with second contact members (13) belonging to the electrical system by moving the control member (7) by hand so as to enter into contact therewith and establish electric connections corresponding to different said operation positions of the electrical system.

23 Claims, 3 Drawing Sheets

DEVICE AT A BOAT

FIELD OF THE INVENTION AND PRIOR ART

The present invention relates to a device for switching between different operation modes of an electrical system on board a boat with an electric motor for propelling the boat, in which the device comprises a control member adapted to be actuated by hand for accomplishing switchings in the electrical system between states corresponding to different operation positions thereof.

It may be a question of all possible types of boats, but the invention is especially directed to smaller boats, and particularly, but accordingly not exclusively, sailing boats provided with an auxiliary motor, in which this advantageously is adapted to be able to operate as generator for loading batteries included in the electrical system when sailing.

A switching device of this type is used for obtaining different operation positions of the electrical system, which may correspond to for example propelling or reversing of the boat through the motor or in the case of a said charging possibility charging of said electric batteries through the electric motor then driven in generator operation. Another operation position is a neutral position, in which the electric motor is not driving the boat forwards or backwards and is neither located in generator operation, and it is desired that in this operation position no unnecessary electrical energy is consumed by the electrical system at the same time as a transition to operation including other operation positions of the electric motor may take place without any noticeable delay.

The switching device in devices already known of this type has contained electronic components for obtaining the switchings through acting upon a control member, such as a control slide. A pulse modulated speed regulator has then for instance been used. A disadvantage of a switching device based on electronic components is that the operation thereof is sensitive to using for example mobile telephones and other radio communication Furthermore, problems to cool the transistors included in the electronic circuits also arise. Considering the environment in which boats normally are present and the difficulties to rapidly get help at sea these switching devices already known are not as robust and reliable as desired.

SUMMARY OF THE INVENTION

The object of the present invention is to provide a device of the type defined in the introduction, which is simple to the construction, robust and functions with a high reliability under all conditions conceivable at sea.

This object is according to the invention obtained by providing such a device with a movable part provided with first contact members and movable with respect to a fixed part having second contact members belonging to the electrical system by moving the control member by hand so as to enter into contact therewith and establish electric connections corresponding to different operation positions of the electrical system.

Thus, through the device according to the invention a switching between the different operation positions is obtained in a purely mechanical way through a movement of a movable part with respect to a fixed part, which makes the device very simple. Accordingly, it is the position of the movable part with respect to the fixed part which through said contact members is directly decisive for which operation position the electrical system assume. The robustness and the operation reliability of such a device get very high. Since no electronic components are included in the switching device there is no risk of failure or heating thereof too much, so that it requires cooling.

According to a preferred embodiment of the invention one of said two parts comprises a printed circuit card having conduction paths thereon, and portions of these conduction paths are adapted to form said contact members for cooperation with contact members on the other of the parts so as to establish said electric connections. It is advantageous that that part on which the printed circuit card is arranged is fixed and the movable part is provided with contact members in the form of contact pieces adapted to establish said electric connections between conduction paths on the printed circuit card by bearing against the printed circuit card, in which it is particularly advantageous if the device comprises members storing potential energy and adapted to spring-loadedly press said contact pieces to bear against the printed circuit card, so that the contact pieces may bear continuously against and slide over the printed circuit card when the movable part moves with respect to the fixed part. The different electric connections may by this be realized in a very simple and at the same time reliable way for obtaining said different operation positions.

According to another preferred embodiment of the invention the movable part may be pivoted with respect to the fixed part, which makes it possible to use a lever as control member for easily moving between the different relative positions of the fixed and the movable part.

According to another preferred embodiment of the invention the movable part is adapted to be pivoted less than 180° with respect to the fixed part, preferably between 100° and 60° with respect thereto for passing all possible said operation positions of the electrical system. The electrical system may by this through the device rapidly and comfortably be brought between the different desired operation positions.

According to another preferred embodiment of the invention the contact pieces extend substantially radially and are adapted to mainly achieve electric connections between conduction paths extending at a radial distance to each other on the printed circuit card, which has turned out to be an advantageous way to obtain the different electrical connections.

According to another preferred embodiment of the invention the electrical system comprises one or more batteries adapted to deliver electrical energy to said electric motor, and said electric connections are carried out to correspond to determined connection positions of these batteries with respect to the electric motor.

According to another preferred embodiment of the invention the device comprises means adapted to define distinct relative positions between the movable and the fixed part corresponding to different steady operation positions of the electrical system, and according to another preferred embodiment of the invention these steady operation positions may be one or more for propelling the boat through the electric motor, one or more for reversing the boat through the electric motor as well as a neutral position, in which the electric motor is not driven. In the case that the electric motor of the electrical system is adapted to also be able to operate as generator and the electrical system also comprises an arrangement for charging said batteries through the electric motor in generator operation, such an operation position may also be constituted by a position for charging the batteries through the electric motor. It is an advantage that there are such means for defining such distinct relative positions, so that they may be obtained rapidly and exactly.

The means may then for example be formed by members snapping into each other in the respective relative position, so that the person controlling the control member clearly feels when the respective distinctive relative position is obtained.

According to another preferred embodiment of the invention said means are adapted to define one steady operation position for high speed forwards and one for high speed backwards of the boat, and said contact members are adapted to establish electric connections in these positions resulting in a series connection of batteries included in the electrical system for delivering a voltage to the electric motor formed by a sum of the voltages of such batteries, through which the motor may be supplied with energy for such high speed. Said means are in corresponding way according to another preferred embodiment of the invention adapted to define one steady operation position for normal speed forwards and one for normal speed backwards of the boat, and the contact members are adapted to establish electric connections in these two operation positions resulting in a parallel connection of batteries included in the electrical system so as to deliver a voltage being just as high as the voltage of an individual battery to the electric motor.

According to another preferred embodiment of the invention said means are adapted to define one steady operation position in the form of a neutral position, in which the electric motor does not consume any electrical energy, and said contact members are adapted to establish electrical connections in said neutral position so that the plus and minus pole of the electric motor are galvanically separated from electric batteries included in the electrical system. A neutral position is by this obtained, in which the electric motor does not consume any electrical energy whatsoever from the electric batteries, so that this position may be assumed during long periods of time, at the same time as it constitutes a ready position, from which the movable part may rapidly be moved with respect to the fixed part for assuming any other desired operation position whatsoever, for example propelling of the boat. Thus, the ability of the electrical system and the boat to react is increased, which is important when severe situations arise. It is very important to rapidly obtain full traction power for stopping the boat, turning the boat against the wind, driving against a very heavy sea and wind and handle other difficult situations. The invention enables this.

According to another preferred embodiment of the invention the contact members are adapted to establish electric connections corresponding to an operation position of the electrical system resulting in a smooth transition to the respective operation position forwards or backwards of the boat by connecting said batteries to the electric motor through a resistor included in the device. The entire voltage of the batteries will by this not suddenly come across the motor, which results in said smoother transition, while the control member thereafter may be moved into a position, in which the resistor is disconnected for assuming the desired operation position forwards or backwards of the boat.

The first contact members of the movable part are according to another preferred embodiment of the invention adapted upon movement of the movable part with respect to the fixed part to slide along the fixed part and successively establish electric connections corresponding to a number of different operation positions. It is then advantageous if said number of operation positions also comprises intermediate positions located between said steady operation positions, which the contact members are adapted to successively pass on their path between the steady operation positions, which makes it possible to arrange such intermediate positions and operation positions in such an order along the movement path of the movable part with respect to the fixed part that an advantageous operation of the electrical system and primarily of the electric motor is obtained, and this forms also a further advantageous embodiment of the invention in which the intermediate positions are arranged in such a sequence and designed in such a way that it is an advantage for obtaining one of said steady operation positions that by before that passing operation positions of the electrical system corresponding to preceding intermediate positions.

Further advantages as well as advantageous features of the invention appear from the following description and the other dependent claims.

BRIEF DESCRIPTION OF THE DRAWINGS

With reference to the appended drawings, below follows a specific description of a preferred embodiment of the invention cited as an example.

In the drawings.

DETAILED DESCRIPTION OF A PREFERRED EMBODIMENT OF THE INVENTION

Figure 1:
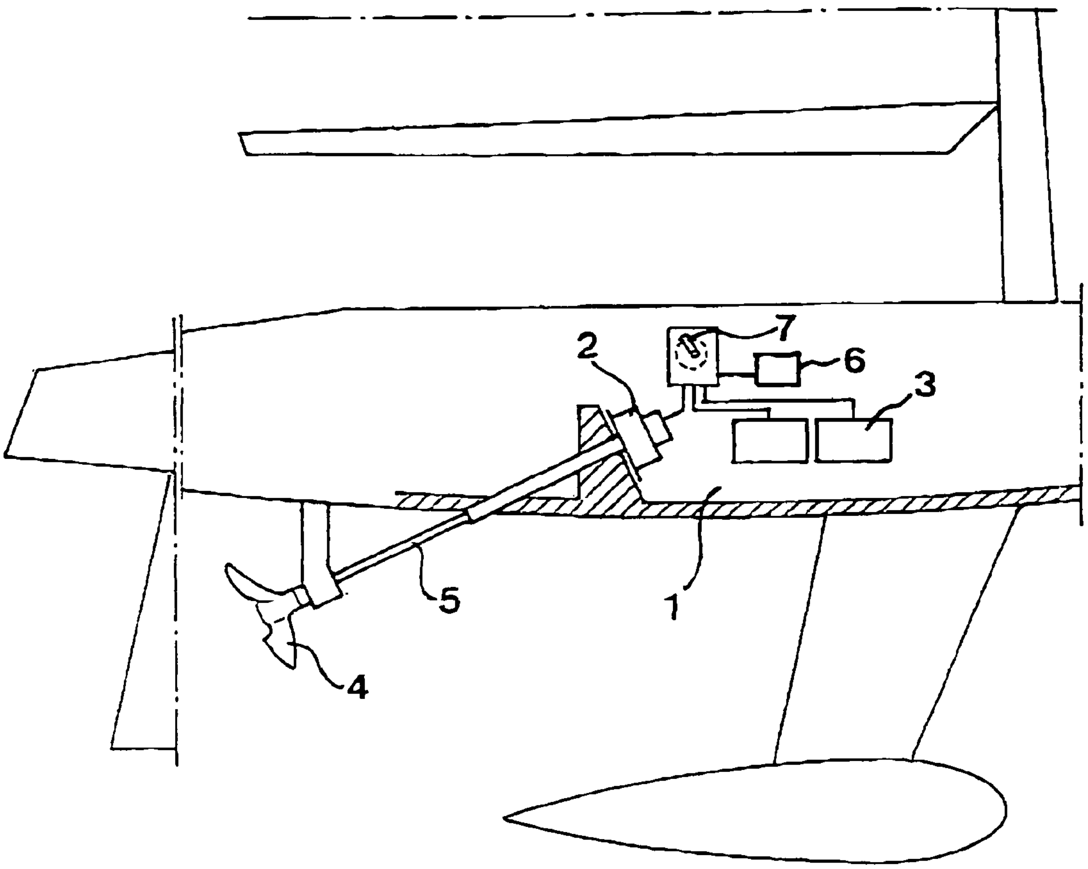
FIG. 1 is a schematic view, which very schematically illustrates the general construction of an electrical system on board a boat, to which a switching device according to the invention is applied.

The general construction of an electrical system on board a boat, to which a switching device according to the present invention is applicable, is illustrated in FIG. 1. The boat 1 is in this case a sailing boat, which may be driven through wind power and/or electrically through an electric motor 2 included in the electrical system, which here is an electric direct current machine, preferably with a permanent magnet motor. The electrical system has also electric batteries 3, preferably conventional 12 volts batteries, which are two to the number. These batteries are adapted to provide the electric motor with electrical energy for driving an axle provided with a propeller 4 to rotate for driving the boat forwards or backwards. The batteries are preferably also adapted to supply refrigerator, autopilot and other electrical equipment on board the boat with electrical energy. However, as an alternative it is possible to have separate batteries for this sake.

The electric motor is advantageously also designed to be able to operate as generator for charging the batteries 3 with electrical energy through a charging arrangement 6 schematically indicated, when the boat is sailed with a sufficiently high speed, normally at least three knots, so as to charge the batteries. The propeller 4 is for this sake preferably a so-called folding-propeller, so that the blades thereof may be folded when no power transmission co-operation is desired between the water and the propeller. Such a folding-propeller pivots the blades thereof outwards by means of the centrifugal force in motor operation. The blades are kept extended by the rotation obtained through the water movement when sailing at charging. The only thing needed is to initially set the folding propeller into rotation by means of the motor. However, propellers having fixed blades are also conceivable.

A device for switching between different operation modes of the electrical system has a control member in the form of a lever 7 schematically indicated and which may be pivoted with respect to a wall 8 of the boat on the place of the helmsman.

It will now be described how the switching device according to the invention is constructed while making reference to the other FIGS. 2–5 at the same time.

Figure 2:
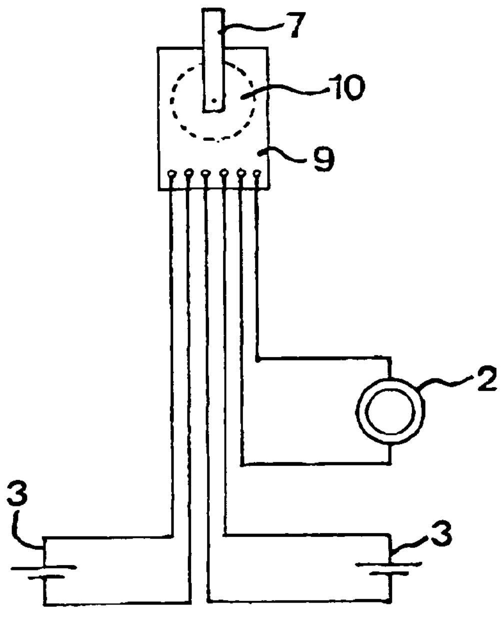
FIG. 2 is a simplified view illustrating a part of the device according to the invention.

It is schematically illustrated in FIG. 2 how the two batteries 3 and the electrical motor 2 are connected to a fixed part 9 of the switching device. The switching device comprises also a movable part 10 in the form of a turnplate, which may be pivoted or turned with respect to the fixed part through actuation of the lever 7.

Figure 3:
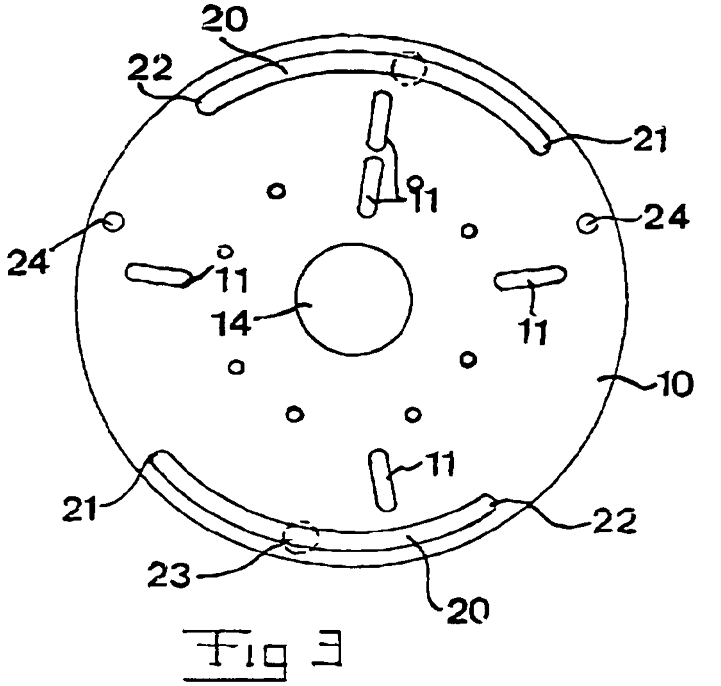
FIG. 3 is an elevation view of a movable part in the form of a turning plate of the switching device according to the invention according to FIG. 2.

The turnplate 10 is shown in elevation in FIG. 3, and it appears that this has five first contact members 11 in the form of contact pieces of electrically conducting material extending substantially radially, which are arranged with a mutual distance of 70–120°. It appears that two of them are arranged along the same radius on the turnplate. The contact pieces 11 are influenced by two springs 12 (see FIG. 5) in the direction out from the plane of the plate 10 and adapted to function as sliding contacts. The turnplate 10 is also provided with two opposite slots 20 defining end positions 21, 22 for the rotation of the turnplate by bolts 23 projecting thereinto. It appears also that the turnplate is provided with two spring loaded balls 24 intended to slide on the printed circuit card and snap into recesses 25 (see FIG. 4) arranged therein so as to define distinct relative positions between the printed circuit card and the turnplate corresponding to different steady or permanent operation positions of the electrical system.

Figure 4:
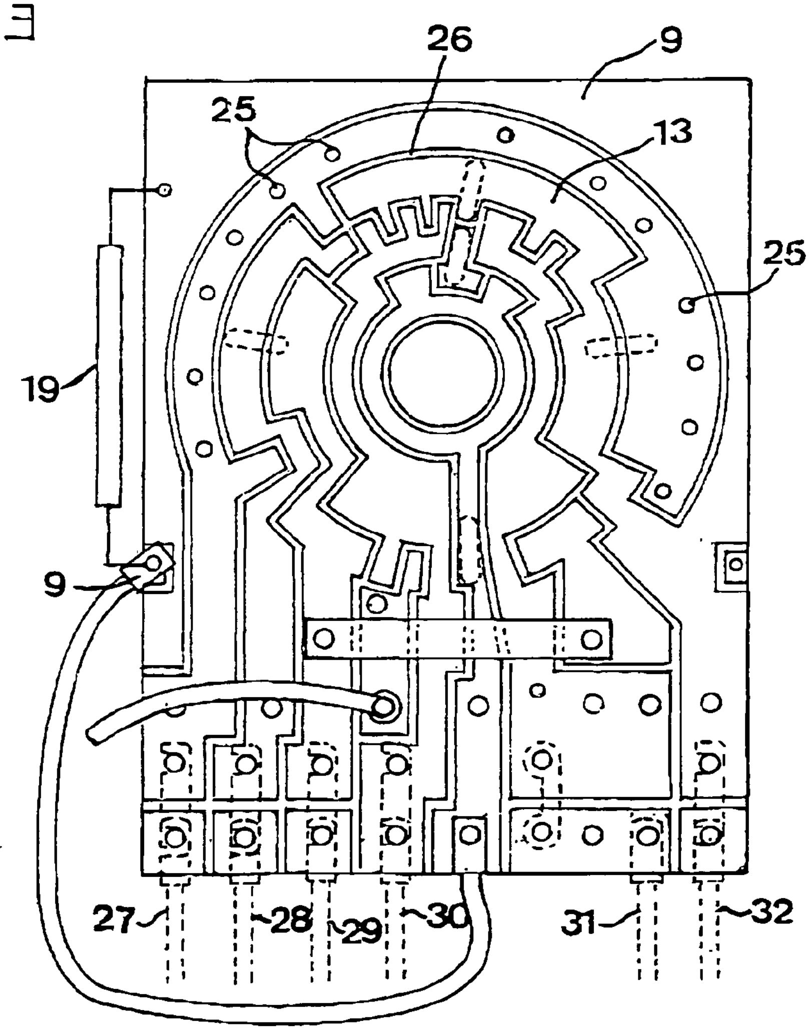
FIG. 4 is an elevation view of a fixed part having a printed circuit card of the device according to the invention according to FIG. 2.

The construction of the fixed part 9 is illustrated in FIG. 4 and this is formed by a printed circuit card of an electrically insulating material, such as Bakelite or glass fibre with a high glass content. Conduction paths 13 of copper are arranged therein with a mutual distance of about 2 mm, which is achieved by water cutting or milling out distance slots 26. More exactly, these conduction paths extend to a large extent in the circumferential direction around an inner centre hole 14 of the fixed part. The contact pieces 11 are here schematically shown by dashing. Cables 27–32 are connected to the conduction paths and run to the plus. (28, 29) and the minus pole (27, 32) and the electrical motor (30, 31).

Figure 5:
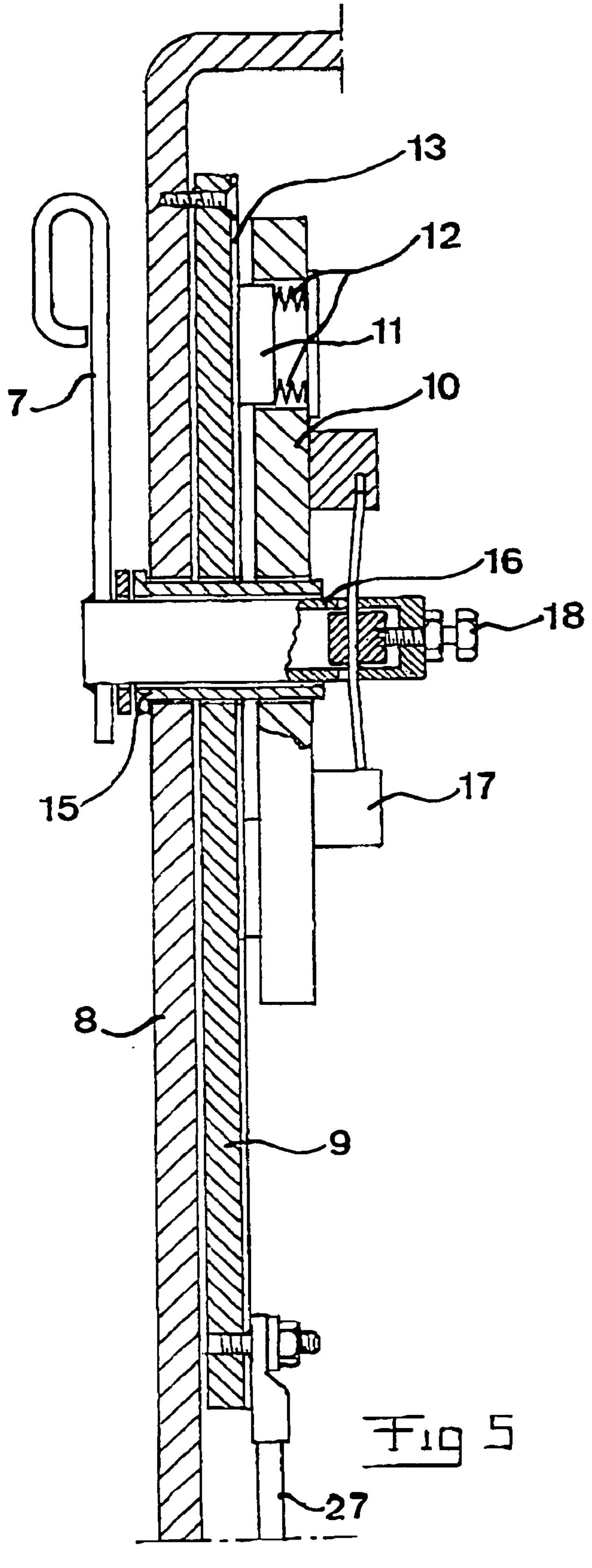
FIG. 5 is an enlarged, partially sectioned side elevation of the device according to the invention according to FIG. 2 arranged on a boat wall.

It appears in FIG. 5 that the fixed part 9 is intended to be fixed to the rear side of a wall 8 of the boat, and that a bearing sleeve 15 is adapted to project through the centre hole 14. An axle 16 connected to the lever 7 extends through the bearing sleeve and is through driving dog brackets 17 rigidly connected to the turnplate 10, which is directed with the contact pieces 11 thereof towards the conduction paths 13 of the printed circuit card. It also appears that an adjusting member in the form of a set screw 18 is arranged for setting the bearing pressure of the turnplate 10 through the contact pieces 11 against the printed circuit card 9 and at the same time function as driving dog of the turnplate 10.

Portions of the conduction paths 13 on the printed circuit card are designed to form second contact members for co-operation with the contact members 11 on the turnplate in such a way that electrical connections corresponding to different operation positions of the electrical system mentioned above are obtained in different relative positions of the turnplate 10 and the fixed part 9. The conduction paths 13, of electrically conducting material, are designed in such a way that in these different positions the batteries 3, the electric motor 2, a resistor 19 (see below), a charging arrangement 6 and possibly other parts included in the electrical system are switched in different ways with respect to each other.

It is in the present case a question of six such distinct relative positions, which correspond in order in the path of movement of the movable part; high speed of the boat backwards, normal speed backwards, neutral position (see definition above), charging position (see definition above), normal speed forwards and high speed forwards. Furthermore, the contact pieces 11 and the conduction paths 3 are designed to co-operate in such a way that a number of different operation positions of the electrical system are obtained in intermediate positions located between said steady operation positions when the movable part is moved with respect to the fixed part and the contact pieces 11 slide along the fixed part and successively establish electric connections corresponding to the different operation positions. However, five distinct positions were well conceivable and are the most natural choice for a motor boat. Even four such positions may be there.

Furthermore, it is illustrated in FIG. 4 how the device has a resistor 19 connected on the printed circuit card 9 between the conduction paths thereof, said resistor being arranged so as to be switched in in series with the batteries in certain operation positions of the electrical system so as to obtain a smooth start of the electric motor forwards and backwards, respectively, as well as smooth stopping the motor by connecting the resistor between + and – on the motor. This resistor may withstand power and may typically have a resistance of 0.25 ohm.

The contact pieces 11 and the conduction paths 13 are adapted to provide eighteen different electric connections corresponding to operation positions of the electrical system with an extension of said movement path over an angle of about 90° between two different end positions of the movement path of the turnplate with respect to the circuit card 9. These are in the present case in the order from one end position corresponding to high speed forwards to the other end position corresponding to high speed backwards the following, in which said distinct steady operation positions are underlined:

1. High speed forwards: the two batteries are connected in series, which gives 24 volts direct voltage to the motor.
2. High speed smooth start: the two batteries are connected in series through a resistor 19 to the motor.
3. Switching position: the two batteries are disconnected from each other, no voltage to the motor. Through this position the mutual connection of the batteries between series and parallel is changed.
4. Normal speed. Smooth start: the two batteries are connected in parallel through the resistor 19 to the motor.
5. Normal speed forwards: the two batteries are connected in parallel which gives 12 volts direct voltage to the motor.
6. Normal speed. Smooth start: the two batteries are connected in parallel and connected to the motor through the resistor 19.
7. Protection position for charging: the two batteries are connected in parallel, the plus pole of the motor is disconnected.
8. The Propeller in charging position: the two batteries are connected in parallel, the plus pole of the motor is connected to the charging arrangement 6 and the minus pole of the motor to the minus pole of the batteries.

9. Protection position for charging: the two batteries are connected in parallel and the plus pole of the motor is disconnected from the battery.
10. Smoothly braking: the two batteries are connected in parallel, the plus pole of the motor is disconnected and the plus pole of the motor and the minus pole of the motor are interconnected through the resistor 19.
11. Neutral position: the two batteries are connected in parallel, the plus and minus pole of the motor are galvanically separated from the batteries. A pole turning of the batteries with respect to the motor so that plus gets minus and conversely is obtained through this.
12. Smoothly braking: the two batteries are connected in parallel, the plus pole of the motor is disconnected and the plus pole of the motor and the minus pole of the motor are interconnected through the resistor 19.
13. Normal speed: Smooth start: the two batteries are connected in parallel and connected to the motor through the resistor 19.
14. Normal speed backwards: the two batteries are connected in parallel so as to give 12 volts to the motor.
15. Normal speed. Smooth start: the two batteries are connected in parallel through the resistor 19 to the motor.
16. Switching position: the two batteries are disconnected from each other, no voltage to the motor. The mutual connection of the batteries between series and parallel is changed through this position.
17. High speed. Smooth start: the two batteries are connected in series to the motor through the resistor 19.
18. High speed backwards: the two batteries are connected in series, which gives 24 volts direct voltage to the motor.

The different positions are arranged in such an order that it is an advantage for obtaining one of said steady operation positions that the operation positions of the electrical system corresponding to intermediate positions located therebefore have been passed. This means that it is an advantage at a transition for example from the position corresponding to normal speed forwards to the position corresponding to high speed forwards that the position 2 corresponding to high speed smooth start has been passed. It is then for the best possible operation and obtaining a minimum wear of the parts advantageous if the control lever 7 is moved with a moderate movement speed, but the switching device functions also excellent if the lever 7 is brutally pulled from one position, for example high speed backwards to another position, in the extreme case high speed forwards. When moving between the different positions these are so arranged with respect to each other that everything has to take place in the correct order for a smooth function of the electric motor, and a good timing between the switching in of the different operation positions is obtained essentially independently of how fast the lever is moved. This is very important when the rotation direction is changed "around" the neutral position.

A further advantage of the switching device according to the invention is that it is possible starting from the neutral position, which does not consume any current, to very rapidly achieve full power forwards or backwards, and that no extra button control is required before the motor may be started, but one may be located in this ready position without consuming any extra energy for this sake. Also the charging position is a ready position. The control 7 may when needed rapidly be moved forwards or backwards and within some second full traction force in the desired direction is obtained.

Another advantage is that the short circuit current is at smoothly braking led through the resistor present for smooth start. The current peak generated at smoothly starting and smoothly braking is efficiently taken care of by the resistor and the propeller, the axle clutch, the motor, the regulating device and the batteries are in this way saved. The smoothly braking is important when the direction of rotation is changed, but also for braking a folding-propeller so that it is folded. Furthermore, it is advantageous that the motor is galvanically separated from the battery in the neutral position for saving the sacrificial anode of the propeller and for reducing possibly galvanic corrosion on the very motor. A switching device according to the invention can also take high currents, such as 500 A, with an extremely high (>99%) efficiency, and this is totally unelectronic. Another advantage is that the device according to the invention may be integrated with the 12 V-system of the boat. Other consumers are connected to one battery. The batteries are besides shorter periods of time connected in parallel. Devices already known are preferably based on 24 V or 36 V, which results in problems for converting voltage, for example when charging in harbour.

The invention is of course not in any way restricted to the preferred embodiment described above, but many possibilities to modifications thereof would be apparent to a person with skill in the art, without for that sake deviating from the basic idea of the invention as defined in the appended claims.

The invention could for example be applied to a regular motorboat and the electrical system not provide any function of charging of batteries through the electric motor, but such possibility to charging could possibly be provided in another way, such as through solar cells.

It would also be possible to arrange the conduction paths on the movable part, even if it is probably to prefer that they, especially considering the cable connections thereto, are arranged on the fixed part.

The batteries could have a rated voltage of 6 V or 24 V instead, so that then 6 or 12 V and 24 or 48 V, respectively, could be delivered to the motor instead for 12 or 24 V.

If the motor and especially the batteries are placed far away from the helmsman's place it may be advantageous to place the control, device close to the batteries or the motor for reducing the voltage drop and weight. 1 m cable has a weight of about 0.5 kg and we have here six cables. An extra lever may then instead be placed at the helmsman's place for controlling the switching device through a control wire connected thereto.

What is claimed is:

1. A device for switching between different operation modes of an electrical system on board a boat (1) with an electric motor (2) for propelling the boat, in which the device comprises a control member (7) structured and arranged to be actuated by hand for accomplishing switchings in the electrical system between states corresponding to different operation positions thereof, and comprises a movable part (10) provided with first contact members (11) and pivotal with respect to a fixed part (9) having second contact members (13) belonging to the electrical system by moving the control member by hand to enter into contact therewith and establish electrical connections corresponding to different operation positions of the electrical system, one of said two parts comprises a printed circuit card (9) having conduction paths (13) thereon, portions of the conduction paths being structured and arranged to form said contact members for co-operation with contact members (11) on the other of the parts to establish said electric connections, and the other of the parts being provided with contact members in the form of contact pieces (11) structured and arranged to establish said electric connections between conduction paths (13) on the printed circuit card by bearing against the printed circuit card, and comprising means (12) for storing potential energy and structured and arranged to spring-loadedly press said contact pieces (11) to bear against the printed circuit card (9).

2. A device according to claim 1, characterized in that the control member is formed by a lever (7) connected to the movable part (10) and structured and arranged to be pivoted with respect to the fixed part (9) for switching between different operation positions.

3. A device according to claim 1, characterized in that the movable part (10) is structured and arranged to be pivoted less than 180° with respect to the fixed part (9) for passing all possible operation positions of the electrical system.

4. A device according to claim 1, characterized in that the conduction paths (13) are arranged on the fixed part (9).

5. A device according to claim 1, characterized in that said contact pieces (11) extend substantially radially and are arranged to mainly establish electric connections between conduction paths (13) extending at a radial distance to each other on the printed circuit card.

6. A device according to claim 1, characterized in that the electrical system comprises one or more batteries (3) arranged to deliver electrical energy to said electric motor (2), and said electric connections are carried out to correspond to determined connection positions of these batteries with respect to the electric motor.

7. A device according to claim 6, in which the electric motor (2) of the electrical system is structured to also function as a generator and the electrical system also comprises an arrangement (6) for charging said batteries through the electric motor in generator operation, and the contact members (11, 13) are structured and arranged to establish electric connections enabling a function of charging the batteries through the electric motor.

8. A device according to claim 6, characterized in that it is structured and arranged for switching between different operation modes of an electrical system provided with batteries (3) of low voltage type having a rated voltage of 6, 12, or 24 V, preferably 12 V.

9. A device according to claim 1, characterized in that it comprises means (24, 25) structured and arranged to define distinct relative positions between the movable (10) and the fixed (9) part corresponding to different steady operation positions of the electrical system.

10. A device according to claim 9, characterized in that said means are structured and arranged to define at least three said steady operation positions, namely one for propelling the boat through the electric motor (2), one for reversing the boat through the electric motor and one neutral position, in which the electric motor is not driven.

11. A device for switching between different operation modes of an electrical system on board a boat (1) with an electric motor (2) for propelling the boat, in which the device comprises a control member (7) structured and arranged to be actuated by hand for accomplishing switchings in the electrical system between states corresponding to different operation positions thereof, characterized in that it comprises a movable part (10) provided with first contact members (11) and movable with respect to a fixed part (9) having second contact members (13) belonging to the electrical system by moving the control member by hand to enter into contact therewith and establish electrical connections corresponding to different operation positions of the electrical system and means (24, 25) structured and arranged to define distinct relative positions between the movable (10) and the fixed (9) part corresponding to different steady operation positions of the electrical system, wherein said means are structured and arranged to define at least six steady operation positions, and these are one for high speed forwards and one for high speed backwards of the boat through the electric motor, one for normal speeds forwards and one for normal speed backwards of the boat through the electric motor, said neutral position and a position for charging said batteries (3) when the electric motor (2) operates as a generator.

12. A device according to claim 9, characterized in that said means are structured and arranged to define a steady operation position for high speed forwards and one for high speed backwards of the boat, and said contact members are structured and arranged to establish electric connections in these positions resulting in a series connection of batteries (3) included in the electrical system for delivering a voltage to the electric motor (2) formed by the sum of the voltages of such batteries.

13. A device according to claim 9, characterized in that said means are structured and arranged to define a steady operation position for normal speed forwards and one for normal speed backwards of the boat, and the contact members are structured and arranged to establish electric connections in these two operation positions resulting in a parallel connection of batteries (3) included in the electrical system to deliver a voltage being just as high as the voltage of an individual battery to the electric motor (2).

14. A device according to claim 9, characterized in that said means are structured and arranged to define a steady operation position in the form of a neutral position, in which the electric motor (2) does not consume any electrical energy, and said contact members are structured and arranged to establish electrical connections in said neutral position so that the plus and minus pole of the electric motor are galvanically separated from the electric batteries (3) included in the electrical system.

15. A device according to claim 14, characterized in that said contact members are structured and arranged to form electric connections in the neutral position resulting in a parallel connection of batteries (3) included in the electrical system.

16. A device according to claim 9, characterized in that said means are structured and arranged to define one steady operation position for charging the batteries (3) included in the electrical system through the electric motor (2) then being in generator operation, and said contact members are in said charging position structured and arranged to establish said electric connections corresponding to a connection of a plus pole of the motor to the charging arrangement and a minus pole of the motor to a minus pole of a battery as well as a parallel connection of batteries included in the electrical system.

17. A device according to claim 10, characterized in that the contact members are structured and arranged to establish electric connections corresponding to an operation position of the electrical system resulting in a smooth transition to the respective operation position forwards or backwards of the boat by connecting said batteries (3) to the electric motor (2) through a resistor (19) included in the device.

18. A device according to claim 1, characterized in that said contact members are structured and arranged to establish an operation position corresponding to smooth braking of the electric motor by connection batteries (3) included in the electrical system in parallel to each other, disconnecting the plus pole of the electric motor (2) from the batteries and interconnecting the plus and minus pole of the motor through a resistor (19).

19. A device according to claim 1, characterized in that the first contact members (11) of the movable part (10) are upon movement of the movable part with respect to the fixed part (9) structured and arranged to slide along the fixed part and successively establish electrical connections corresponding to a number of different operation positions.

20. A device according to claim 9, characterized in that said number of operation positions also comprises intermediate positions located between said steady operation positions, and the first contact members (11) are structured and arranged to successively pass these positions on their path between the steady operation positions.

21. A device according to claim 18, characterized in that the intermediate positions are arranged in such an order and structured and arranged in such a way that it is an advantage for obtaining one of said steady operation positions to before that pass operation positions of the electrical system corresponding to preceding intermediate positions.

22. A device according to claim 3, characterized in that the movable part (10) is pivotal between 100° and 60° with respect to the fixed part (9) for passing all possible operation positions of the electrical system.

23. A device for switching between different operation modes of an electrical system on board a boat (1) with an electric motor (2) for propelling the boat, in which the device comprises a control member (7) structured and arranged to be actuated by hand for accomplishing switchings in the electrical system between states corresponding to different operation positions thereof, and comprises a movable part (10) provided with first contact members (11) and movable with respect to a fixed part (9) having second contact members (13) belonging to the electrical system by moving the control member by hand to enter into contact therewith and establish electrical connections corresponding to different operation positions of the electrical system, and the movable part (10) is a turnplate mounted upon an axle (16) to which the control member (7) is attached.

* * * * *